Jan. 6, 1931. J. LEDERER 1,788,164
AIR FILTER
Filed June 16, 1924
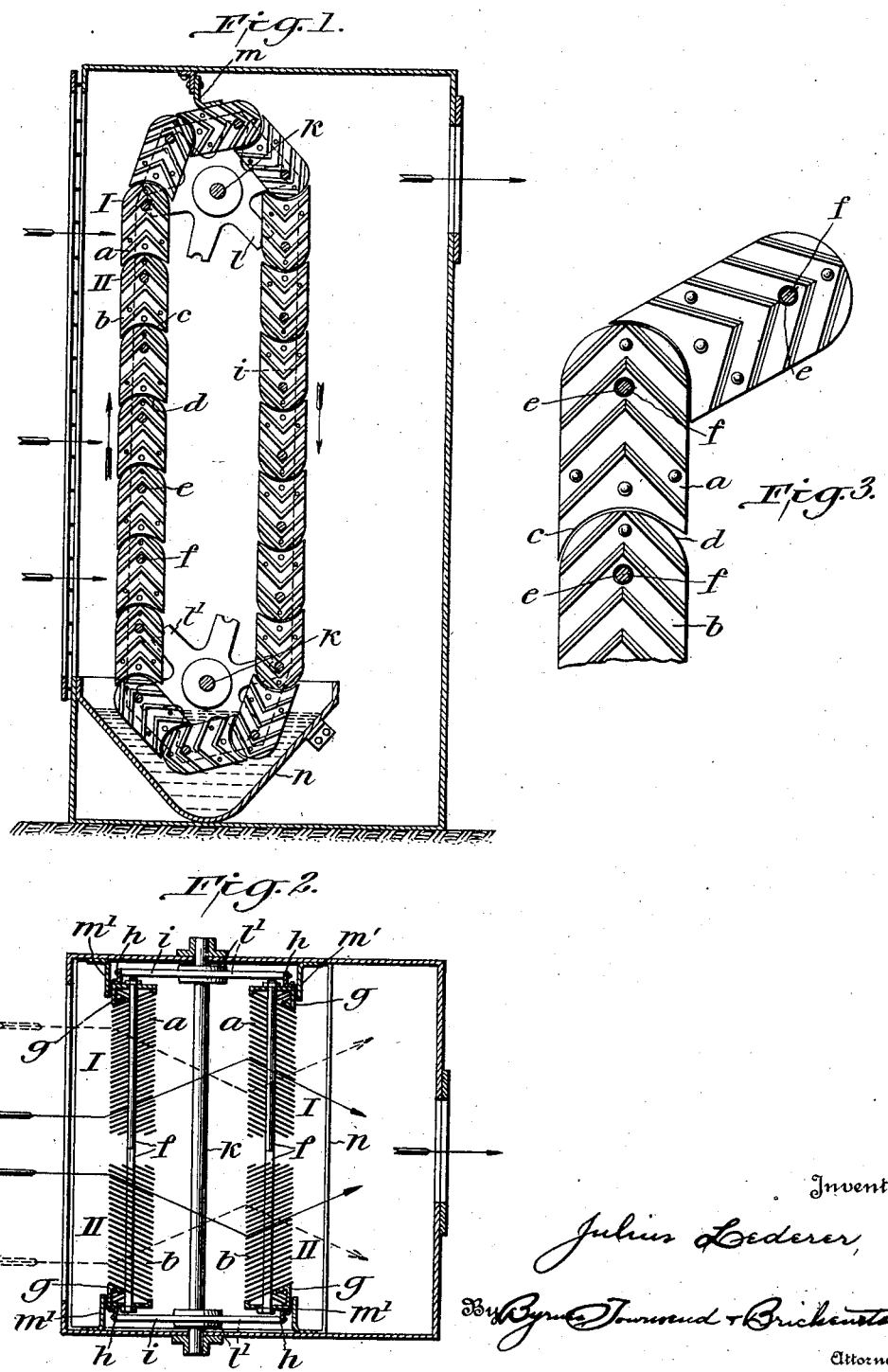

Patented Jan. 6, 1931

1,788,164

UNITED STATES PATENT OFFICE

JULIUS LEDERER, OF BERLIN, GERMANY, ASSIGNOR, BY MESNE ASSIGNMENTS, TO AMERICAN AIR FILTER COMPANY, OF LOUISVILLE, KENTUCKY, A CORPORATION OF DELAWARE

AIR FILTER

Application filed June 16, 1924, Serial No. 720,441, and in Germany June 16, 1923.

This invention refers to air filters and in particular to that class of air filters in which a plurality of plates are disposed in parallel relation and projections are provided on the plates in the interspaces defining tortuous paths for the air currents, an example of such constructions being shown in the patent to Aus der Mark, No. 1,519,739. In this class of air filters the plurality of plates preferably form flexible chain-like members to separate the space containing the dust or contaminated air from the pure air space by an endless chain or a plurality of linked individual members the several links of which constitute the filtering element. My invention is intended to improve the construction and operation of devices of this kind in such a manner that the plates become adapted for being secured to their bolts obliquely to the direction of the air currents. This oblique position of the individual plates is advantageous because the air currents immediately after having entered the interspaces between the plates are laterally deviated suddenly whereby the filtering effect is increased.

The invention contemplates the formation of a filter chain in which the plates of adjacent links are not interleaved, but in which chain each link is provided with a convex end portion which enters the concave end portion of the adjacent link. By this construction it is possible to prevent open paths between adjacent links and also to secure the plates on their bolts or bars obliquely to the air current. Each plate row is limited at the ends by wedge-like members the angle of which corresponds to the inclination of the plates towards the air current.

My invention will be described with reference to the drawings showing a preferred embodiment of the invention in Fig. 1 as a vertical longitudinal sectional view of the filter, Fig. 2 a horizontal sectional view of different rows of plates, Fig. 3 a detailed view for the link connection of the plates.

The chain filter is made up of a number of groups or series of substantially parallel plates $a$, $b$ which are assembled as composite filter units and connected by suitable means to form chain links I and II. Each of the plates is of elongated shape and has a concave end portion $c$ and a convex end portion $d$, the curvature of the ends being substantially identical, except that the inner edge of the concave end is cut back to permit the relative angular movement of the links. An aperture $e$ is provided at the center of the convex end portions for pivotally mounting the plates upon the supporting bolt $f$. As shown in Fig. 2, the plates of adjacent links I and II are preferably inclined in opposite directions for securing repeated and marked deflections of the air stream from its general direction of travel through the filter. As shown in Fig. 1, the endless chain is composed of an even number of links, which arrangement results in a reversal of inclination of the plates of the links of the front and rear runs of the chain which are in horizontal alignment.

To secure the above described oblique positioning of the plates, each bolt $f$ is provided with one or more wedge members $g$ which have one face thereof inclined to the axis of the bolt but parallel to a line traced by a point on the bolt as it travels along the front and rear runs of the chain. The plate adjacent the wedge member $g$ contacts with the inclined surface thereof to determine the inclination of the plates of the link. As shown in Fig. 2, members $g$ are preferably provided at each end of the bolt $f$, and the members $g$ are secured by angle irons $h$ to the driving bands or chains $i$. The filter is supported by and driven from the shafts $k$ by means of upper and lower pairs of pulleys $l$, $l'$ the pulleys of each pair being located at opposite sides of the endless filter chain. To prevent impure air from passing between the filter chain and the side and top walls of the casing, suitable flexible closing members $m$, $m'$, respectively, are provided. The lower interspace is preferably closed by a vessel $n$ containing an adhesive liquid, such as oil, glycerine, etc., through which the lower end of the chain travels.

It will be noted that the plates of adjacent links are not interleaved, but that unobstructed paths between the links are prevented due to the location of the concave end of one link within the convex end of the adjacent link. The plates of each link are supported by the bolt *f* which passes through the center of the convex end of the plates and the bearing surface provided by the convex ends *d* of the adjacent link. Due to this method of mounting the plates it is possible to arrange the plates at an angle to the pivot bolts. In addition to the changes in direction which result from the inclination of the plates, further changes in direction may be secured by providing baffles upon the opposite faces of the plates.

As viewed in Fig. 3 the curvature of the end portions is that of circular arcs, except that one edge of the end *c* is cut back to permit the necessary angular movement of the links. The curvature of the ends may vary with the inclination of the plates, it being obvious that the several plates, as viewed in a direction normal to the plates, must be elliptical to provide a link having an end surface, as viewed axially of the bolt *f*, which is that of a portion of a right circular cylinder.

It will be understood that the invention is not limited to the specific embodiment which I have described, since elongated chain links having concavo-convex end portions may be formed in other ways than by building up a series of parallel plates. This and many other changes which may be made in the several parts, their relative size, shape and location fall within the scope of my invention as set forth in the following claims.

I claim:

1. In an air filter, a filter unit comprising a plurality of substantially parallel plates, a pivotal support for said plates at one end thereof, and means positioning said plates obliquely to said support and edgewise to the air stream.

2. In an endless chain filter, a link comprising side chain members, a pivot bolt and a plurality of elongated plates, each of said plates having a concave end and a convex end of approximately semi-circular outline, the said bolt passing through the convex end portions of said plates.

3. An endless chain filter comprising a plurality of chain links, each of said links comprising a plurality of elongated plates which each have a concave end portion and a convex end portion, and a bolt passing through the convex end portions of said plates; the said convex end portion of one link lying within the concave portion of the adjacent link.

4. The invention as claimed in claim 3, wherein the plates of each of said links are obliquely positioned upon their respective bolts.

5. The invention as claimed in claim 3 wherein the plates of each of said links are obliquely positioned upon their respective bolts, and the plates of adjacent links are inclined in opposite directions.

6. In an endless chain filter, a chain link comprising a supporting bar, a plurality of substantially parallel plates on said bar, and a member on said bar having one face thereof inclined to said bar, the plate adjacent said member being in contact with the said inclined face thereof, whereby the said plates are obliquely arranged upon said bar.

7. A filter comprising composite filter units each having a concave end and a convex end, pivot bolts passing through the convex ends of the several units and means securing said bolts to a driving chain.

8. Air filtering apparatus comprising a plurality of transverse bolts, spacing members pivotally connected thereto, and a plurality of plates mounted in parallel relation on each bolt and with the plane of their opposed parallel faces disposed obliquely to the longitudinal axis of said bolt.

9. A composite filtering unit for air filters comprising a plurality of transverse plate carrying bolts, a connecting member interposed between each two adjacent bolts, and a series of filter plates pivotally mounted on each bolt obliquely to the longitudinal axis thereof and with one end of one series engaging and riding upon the end of an adjoining series.

10. Air filtering apparatus comprising a series of plates arranged with opposed faces in parallel relation, each plate having a convex end and a reentrant end, a second series of plates similarly arranged, and a pivotal bolt extending through an end portion of each plate of each of said series, the convex ends of one series being positioned to ride freely within the reentrant end of a contiguous series to permit deflection of one series relatively to the other.

11. A link for an endless chain filter comprising a composite filter unit having a concave end portion and a convex end portion.

12. An endless chain filter comprising a plurality of connected links each presenting a composite filter unit having a convex end portion and a concave end portion, the convex end of each unit lying within the concave end of an adjacent unit.

13. In an air filter of the endless chain type, a plurality of composite filter units each comprising a bolt and a series of parallel plates mounted thereon with longitudinal edges presented toward the air stream and with their opposed faces arranged obliquely to the general direction of air travel, means for connecting said units to form a chain, and means for driving the connected units.

In testimony whereof, I affix my signature.

JULIUS LEDERER.